United States Patent [19]
Yamaguchi

[11] Patent Number: 5,517,639
[45] Date of Patent: May 14, 1996

[54] SYSTEM FOR OUTPUTTING EXECUTION TIME OF INDUSTRIAL AUTOMATED APPARATUS

[75] Inventor: Hideki Yamaguchi, Tokyo, Japan

[73] Assignee: Canon Kabushiki Kaisha, Tokyo, Japan

[21] Appl. No.: 311,718

[22] Filed: Sep. 23, 1994

Related U.S. Application Data

[63] Continuation of Ser. No. 688,277, Apr. 22, 1991, abandoned.

[30] Foreign Application Priority Data

Apr. 23, 1990 [JP] Japan ............................. 2-105381
Apr. 18, 1991 [JP] Japan ............................. 3-086599

[51] Int. Cl.⁶ ........................................ G06F 11/34
[52] U.S. Cl. .................. 395/550; 364/222; 364/264.5; 364/DIG. 1; 395/80; 395/700
[58] Field of Search ...................... 395/80, 550, 700

[56] References Cited

U.S. PATENT DOCUMENTS

| | | | |
|---|---|---|---|
| 4,231,106 | 10/1980 | Heap et al. | 364/900 |
| 4,511,961 | 4/1985 | Penton | 364/200 |
| 4,635,183 | 1/1987 | Isobe et al. | 364/141 |
| 4,879,646 | 11/1989 | Iwasaki et al. | 364/200 |
| 4,924,383 | 5/1990 | Suzuki | 364/200 |
| 4,937,740 | 6/1990 | Agarwal et al. | 364/200 |
| 4,937,780 | 6/1990 | Geyer et al. | 395/550 |
| 4,951,189 | 8/1990 | Onodera et al. | 364/141 |
| 5,047,919 | 9/1991 | Sterling et al. | 364/200 |
| 5,103,394 | 4/1992 | Blasciak | 395/575 |
| 5,173,809 | 12/1992 | Sakamoto et al. | 364/578 |
| 5,204,956 | 4/1993 | Danuser et al. | 395/575 |

*Primary Examiner*—Ken S. Kim
*Attorney, Agent, or Firm*—Fitzpatrick, Cella, Harper & Scinto

[57] ABSTRACT

A system outputs the execution times of an industrial automated apparatus in which, when an instruction interpreting and executing device for interpreting and executing instructions executes each instruction, ID information specifying each executed instruction and time information indicating time at which each instruction is executed are correlated and stored, and execution time of each instruction is calculated, and then outputted, based upon designated ID information and the time information correlated therewith. By virtue of this arrangement, the execution times of desired instructions in an operation program having various steps are outputted accurately in units of the individual instructions.

14 Claims, 21 Drawing Sheets

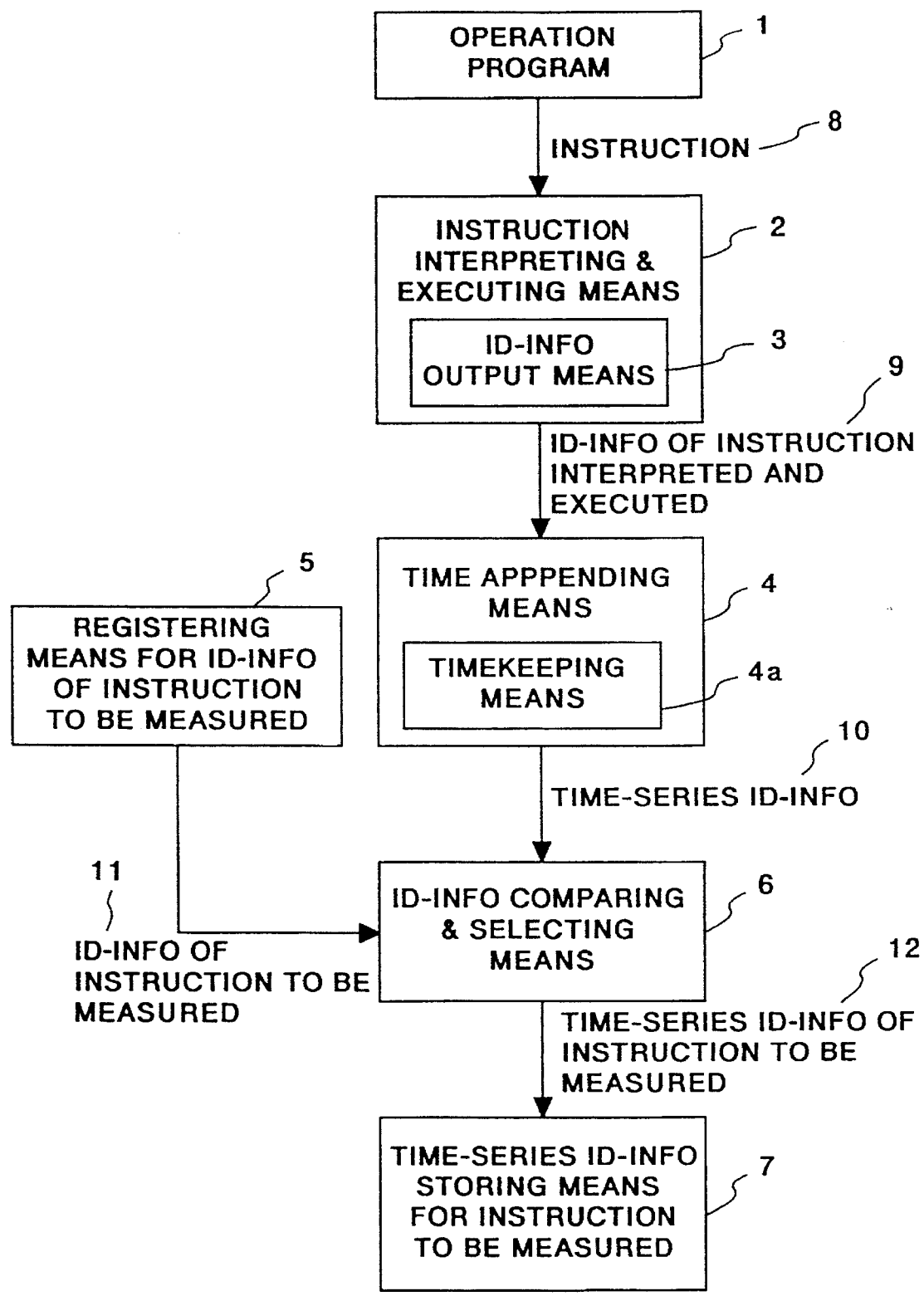
F I G. 1

FIG. 3

| PROGRAM NO. | 1 | | 2 | | 3 | |
|---|---|---|---|---|---|---|
| | LINE NO. | INSTRUCTION | LINE NO. | INSTRUCTION | LINE NO. | INSTRUCTION |
| PROGRAM | 10 | MOV P(1) | 10 | MOV P(4) | 10 | MOV P(7) |
| | 20 | OUT 1.0 | 20 | OUT 2.0 | 20 | OUT 3.0 |
| | 30 | MOV P(2) | 30 | MOV P(5) | 30 | MOV P(8) |
| | ----- | ----- | ----- | ----- | ----- | ----- |

FIG. 4

| PROCESS NO. | PROGRAM NO. | LINE NO. | ... | INSTRUCTION-END TIME | LAST END TIME (INSTRUCTION STARTING TIME) |
|---|---|---|---|---|---|
| 41 | 42 | 43 | | 44 | 45 |

| TASK NO. | PROGRAM NO. | LINE NO. | INSTRUCTION |
|---|---|---|---|
| 0 | 0 | 10 | PRINT "Prog.0 START" |
| | | 20 | CALL Prog.1 |
| | | 30 | CALL Prog.2 |
| | | 40 | CALL Prog.3 |
| | | 50 | GO TO 20 |
| | | ⋮ | |
| | 1 | 10 | PRINT "Prog.1 START" |
| | | 20 | N = N + 1 |
| | | 30 | MOV P (1) |
| | | 40 | PRINT "Prog.1 END" |
| | | 50 | RET |
| | | ⋮ | |
| | ⋮ | | |
| 1 | 0 | ⋮ | |
| | | 30 | WAIT INP(125) = 1 |
| | | ⋮ | |
| | ⋮ | | |
| 2 | 0 | ⋮ | |
| | | 30 | A = A + 1 |
| | | 40 | PRINT A |
| | | ⋮ | |
| | ⋮ | | |
| 3 | 0 | ⋮ | |
| | | 50 | SET MOV P(2) |
| | | 60 | OUT (127.1) |
| | | ⋮ | |
| | ⋮ | | |

F I G. 6

| ① | ② | ③ | ④ | ⑤ | ⑥ | ⑦ |
|---|---|---|---|---|---|---|
| 0 | 2 | 0 | 30 |  |  | POSITIONING-COMPLETE FLAG = TRUE |
| 1 | 3 | 0 | 50 | END | TRUE |  |
| 2 | 0 | 0 | 50 |  |  |  |
| ---- |  |  |  |  |  |  |

① TRIGGER NO.
② TASK NO.  ⎫
③ PROGRAM NO. ⎬ ID
④ LINE NO.  ⎭
⑤ RECORDING CONTROL FLAG
⑥ INSTRUCTION-COMPLETE CHECK FLAG
⑦ INSTRUCTION-COMPLETE CHECK CONDITIONS

F I G. 7

| TRIGGER NO. | TASK NO. | PROGRAM NO. | LINE NO. | RECORDING CONTROL FLAG | INSTRUCTION-COMPLETE CHECK FLAG | INSTRUCTION-COMPLETE CHECK CONDITIONS |
|---|---|---|---|---|---|---|
| 0 | 2 | 0 | 30 | | | POSITIONING-COMPLETE FLAG = TRUE |
| 1 | 3 | 0 | 50 | | TRUE | |
| 2 | 0 | 0 | 50 | END | | |
| 3 | | | | | | |
| 4 | | | | | | |
| 5 | | | | | | |
| 6 | | | | | | |
| ----- | | | | | | |

FIG. 8

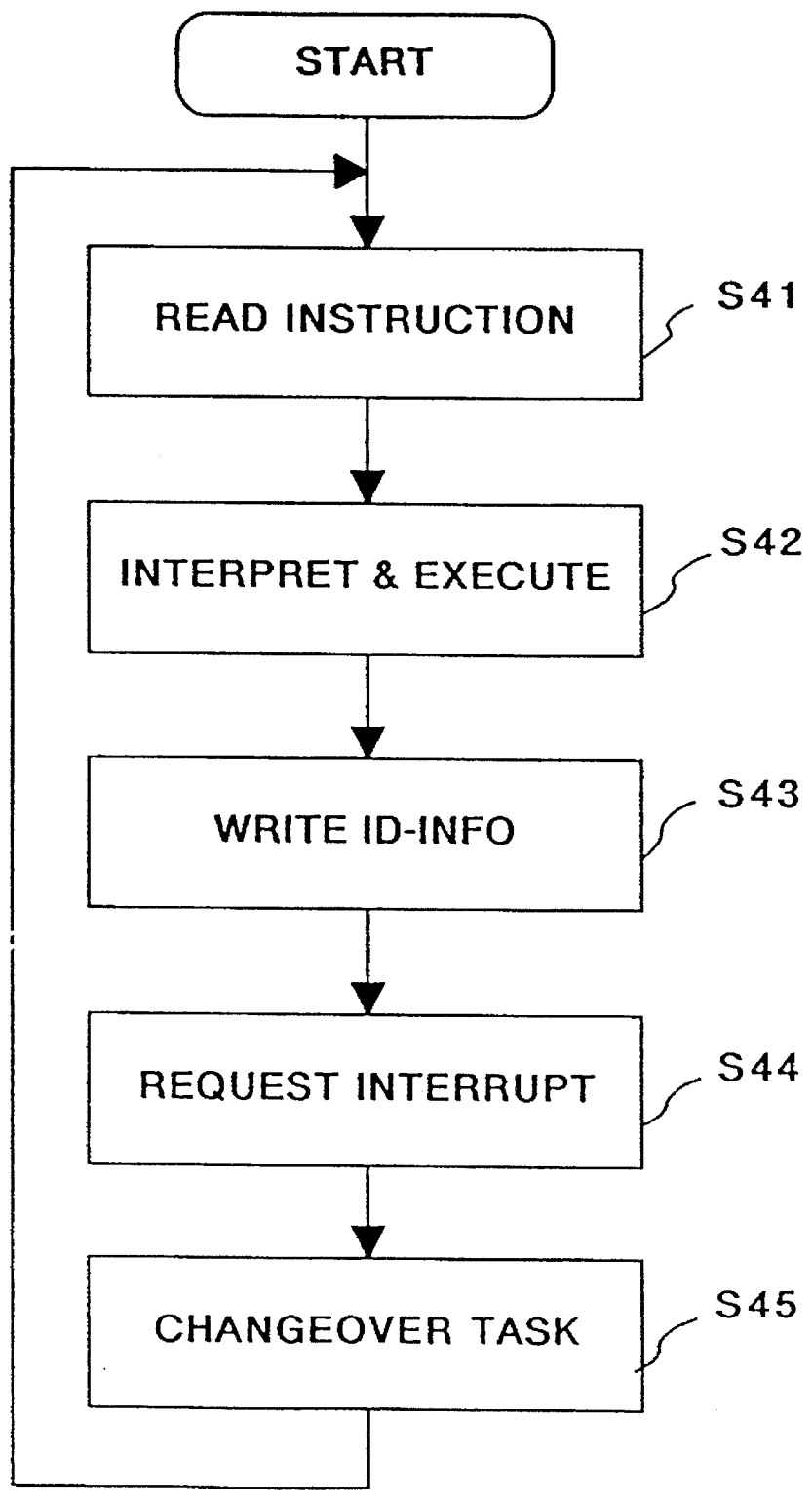
F I G. 9

| CURRENT TASK NO. | |
|---|---|

| TASK | CURRENT PROGRAM NO. | CURRENT LINE NO. |
|---|---|---|
| 0 | | |
| 1 | | |
| 2 | | |
| 3 | | |

F I G. 10

| DATA TABLE 0 | LINE NO.<br>PROGRAM NO.<br>TASK NO. } ⓘD |
|---|---|
| DATA TABLE | } ⓘD |
| | END TIME |
| | START TIME |
| PRE TABLE [ 0 ] | ⓘD |
| | PRE END TIME } ※ |
| | PRE START TIME |
| PRE TABLE [ 1 ] | ※ |
| PRE TABLE [ 2 ] | ※ |
| PRE TABLE [ 3 ] | ※ |

F I G.  11

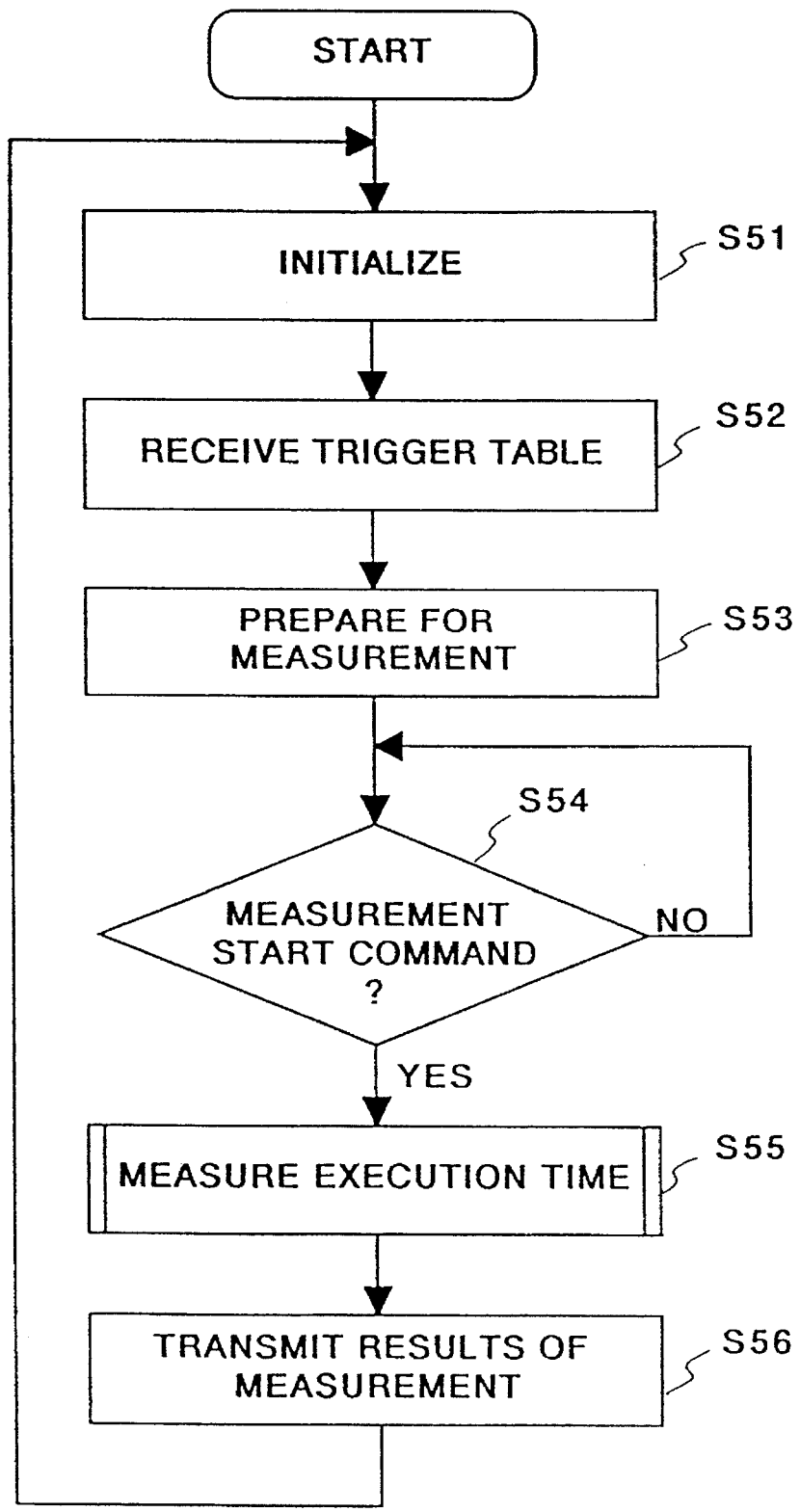
F I G. 12

| NO. | TASK NO. | PROGRAM NO. | LINE NO. | STARTING TIME | END TIME |
|---|---|---|---|---|---|
| 0 | 0 | 1 | 10 | 0:0:9" 990ms | 0:0:9" 992ms |
| 1 | 2 | 0 | 30 | 0:0:9" 994ms | 0:0:9" 995ms |
| 2 | 3 | 0 | 50 | 0:0:9" 998ms | 0:0:12" 202ms |
| ---- | | | | | |

| NO. | ID | STARTING TIME | END TIME | |
|---|---|---|---|---|
| 1 | | | | ← ID (B) |
| 2 | | | | ← ID (C) |
| 3 | | | | |
| | | | | |

F I G. 17A

| NO. | TRIGGER NO. | TRACE BUFFER POINTER |
|---|---|---|
| 1 | 1 | 1 |
| 2 | | |
| 3 | | |
| | | |

F I G. 17B

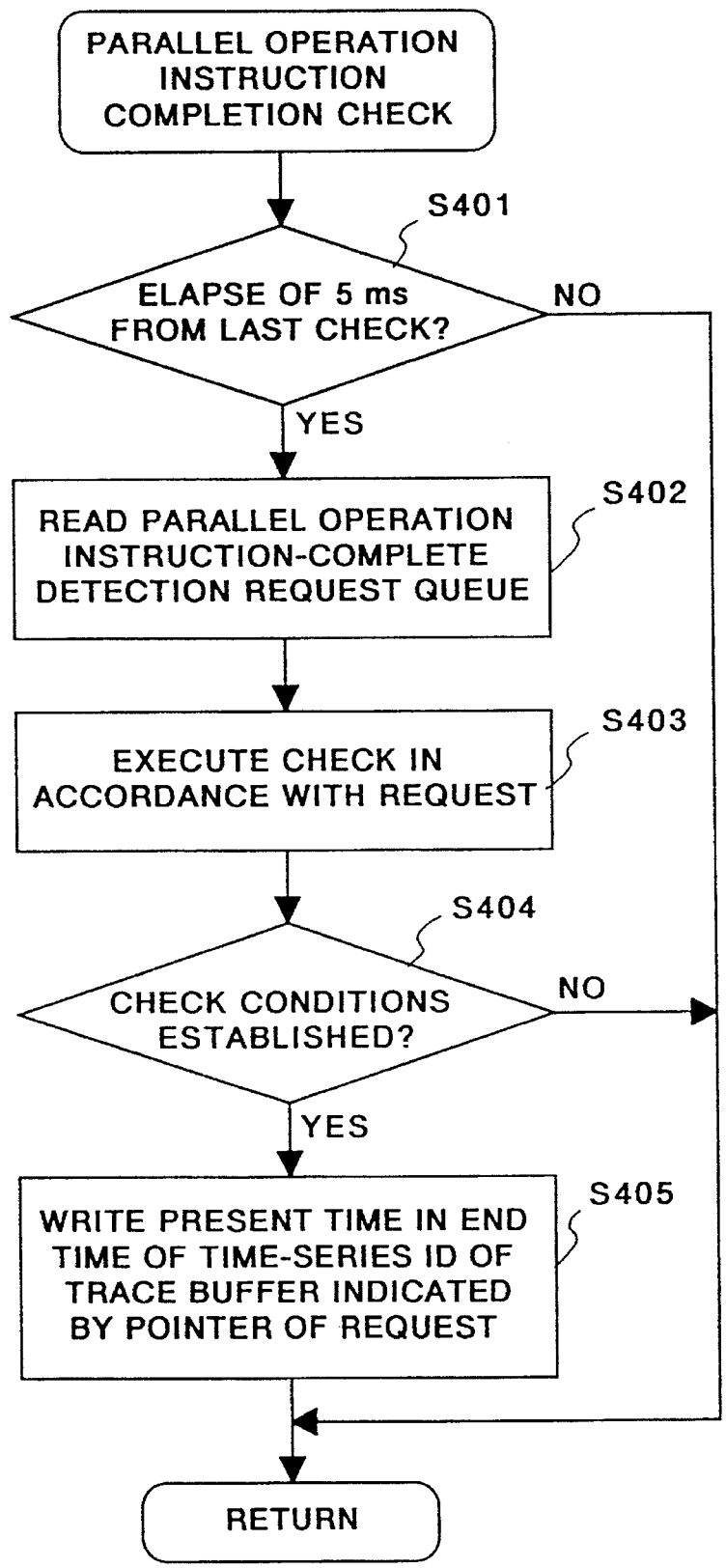
F I G. 18

| ① | ② | ③ | ④ | ⑤ | ⑥ | ⑦ | ⑧ |
|---|---|---|---|---|---|---|---|
| 0 | 0 | 2 | 0 | 30 | A = A + 1 | 0:0:9" 998ms | 1ms |
| 1 | 1 | 3 | 0 | 50 | SET MOV P(2) | 0:0:9" 998ms | 2204ms |
|   |   |   |   |   |   |   |   |

① TRACE BUFFER NO.
② TRIGGER NO.
③ TASK NO.
④ PROGRAM NO.
⑤ LINE NO.
⑥ OPERATION PROGRAM INSTRUCTION
⑦ EXECUTION STARTING TIME
⑧ EXECUTION TIME

F I G. 19

SYSTEM FOR OUTPUTTING EXECUTION TIME OF INDUSTRIAL AUTOMATED APPARATUS

This application is a continuation of application Ser. No. 07/688,277, filed Apr. 22, 1991, now abandoned.

BACKGROUND OF THE INVENTION

1. Field of the Invention

This invention relates to a system for measuring and outputting the execution time of each of the instructions of an operation program in an industrial automated apparatus such as an industrial robot or NC machine tool.

2. Description of the Prior Art

In an industrial automated apparatus such as an industrial robot, tact or operating time is an important factor which decides the production cost of a manufactured produced. In case of an industrial robot, operation or robot motion is controlled by an operation program. Operating time differs depending upon the method of parallel operation involving the path of motion, the jig, etc. Accordingly, time is wasted if the content of the operation program is inappropriate.

In order to search for locations in the program where wasted time occurs, the conventional practice is to measure the operating time of a robot by any of the following methods:

(1) Operating time is measured by a stop-watch or the like while observing the motion of an element such as the robot arm.

(2) The input signal to a servomotor or the like is measured using a device such as a pen recorder.

(3) An instruction for output to a display unit is temporarily inserted before or after an instruction to be measured, and the instruction is measured using a stop-watch, pen recorder, etc.

(4) A function such as one which returns time is temporarily inserted before or after an instruction to be measured, and the instruction is then measured.

Certain problems are encountered in the aforesaid methods. Specifically, in method (1), (a) measurement errors arise owing to reliance upon visual observation, thereby making high precision measurement impossible; (b) an instruction involving rapid motion cannot be measured; and (c) instructions whose associated motions are not visible to the eye, such as arithmetic and logical instructions, cannot be measured.

In method (2), (a) an instruction which operates a servomotor generally is executed frequently, and therefore it is difficult to specify the operation of the instruction whose execution time is to be measured; and (b) instructions such as arithmetic and logical instructions are not outputted to the exterior of the system and therefore cannot be measured.

In methods (3) and (4), (a) it is necessary to rewrite the operation program whenever measurement is performed, and therefore the burden on the measurer is great; and (b) the greater the number of times rewriting is performed, the higher the possibility that bugs will develop in the program.

SUMMARY OF THE INVENTION

An object of the present invention is to provide a system for outputting the execution times of an industrial automated apparatus, in which the execution times of desired instructions are outputted accurately in units of individual instructions.

Another object of the present invention is to provide a system for outputting the execution times of an industrial automated apparatus, in which the execution times of desired instructions, in processing for executing a plurality of tasks in parallel, are outputted in accurate fashion.

A further object of the present invention is to provide a system for outputting the execution times of an industrial automated apparatus, in which the execution times of parallel operation instructions are outputted accurately.

According to the present invention, there is provided a system for outputting the execution times of an industrial automated apparatus in which, when instruction interpreting and executing means for interpreting and executing instructions executes each instruction, ID information specifying each executed instruction and time information indicating time at which each instruction is executed are correlated and stored, and execution time of each instruction is calculated, and then outputted, based upon designated ID information and the time information correlated therewith.

In another aspect of the present invention, there is provided a system for outputting execution times of an industrial automated apparatus, comprising output means which, whenever instruction interpreting and executing means for interpreting and executing instructions executes each instruction in a program, is for outputting ID information identifying each instruction, appending means for appending time information, which indicates time at which the ID information was outputted, to the ID information, registering means for registering, in advance, ID information indicative of instructions whose execution times are desired to be measured, comparing means for comparing the already registered ID information with ID information outputted by the output means, and execution-time output means for measuring, and then outputting, execution time of a registered instruction based upon the time information appended to ID information selected by the comparing means, whereby the execution time of any instruction in an operation program is outputted.

In another aspect of the present invention, there is provided a system for outputting the execution times of an industrial automated apparatus, comprising ID-information output means which, whenever instruction interpreting and executing means for interpreting and executing instructions executes each instruction in a program, outputs ID information identifying each instruction, appending means for appending time information, which is indicative of time at which the ID information was outputted to the ID information, registering means for registering ID information, which is indicative of an instruction whose execution time is desired to be measured, and, when the instruction of this ID information is executed, instruction-execution end conditions for determining whether an instruction is at an end based upon occurrence of an event caused by start of execution of the next instruction or end of execution of an instruction, comparing means for comparing the already registered ID information with ID information outputted by the output means, and execution-time output means for computing, and then outputting, execution time of a registered instruction based upon the time information appended to ID information selected by the comparing means, whereby the execution time of any instruction in an operation program is outputted.

When instructions having the same ID information are executed consecutively, the total of the individual execution times is adopted as the execution time of the instructions.

BRIEF DESCRIPTION OF THE DRAWINGS

FIG. 1 is a block diagram illustrating an arrangement for realizing a system which outputs the execution times of an industrial automated apparatus according to the present invention;

FIG. 3 is a diagram illustrating the state of logical storage of an operation program according to the present embodiment;

FIG. 4 is a diagram showing the constitution of ID information and time information according to the present embodiment;

FIG. 6 is a diagram showing an example of an operation program;

FIG. 7 is a diagram showing a trigger input screen of a personal computer;

FIG. 8 is a diagram showing the composition of a trigger table;

FIG. 9 is a flowchart showing the execution sequence of an operation program;

FIG. 10 is a diagram showing a current instruction pointer;

FIG. 11 is a diagram showing a working table, which includes a common memory, for storing ID information as well as the starting and end times of instruction execution;

FIG. 12 is a flowchart showing the processing sequence of a tact analyzer measurement unit;

FIG. 15 is a diagram showing the composition of a time-series ID queue;

FIG. 17A is a diagram showing the composition of a trace buffer;

FIG. 17B is a diagram showing the composition of a completion-check request queue for checking completion of a parallel-execution instruction;

FIG. 18 is a flowchart illustrating the sequence of a completion check for checking completion of a parallel-execution instruction; and FIG. 19 is a diagram showing an example of outputs of instruction-execution times on the display screen of a personal computer.

DESCRIPTION OF THE PREFERRED EMBODIMENTS

<General Construction>

Figure 2A:
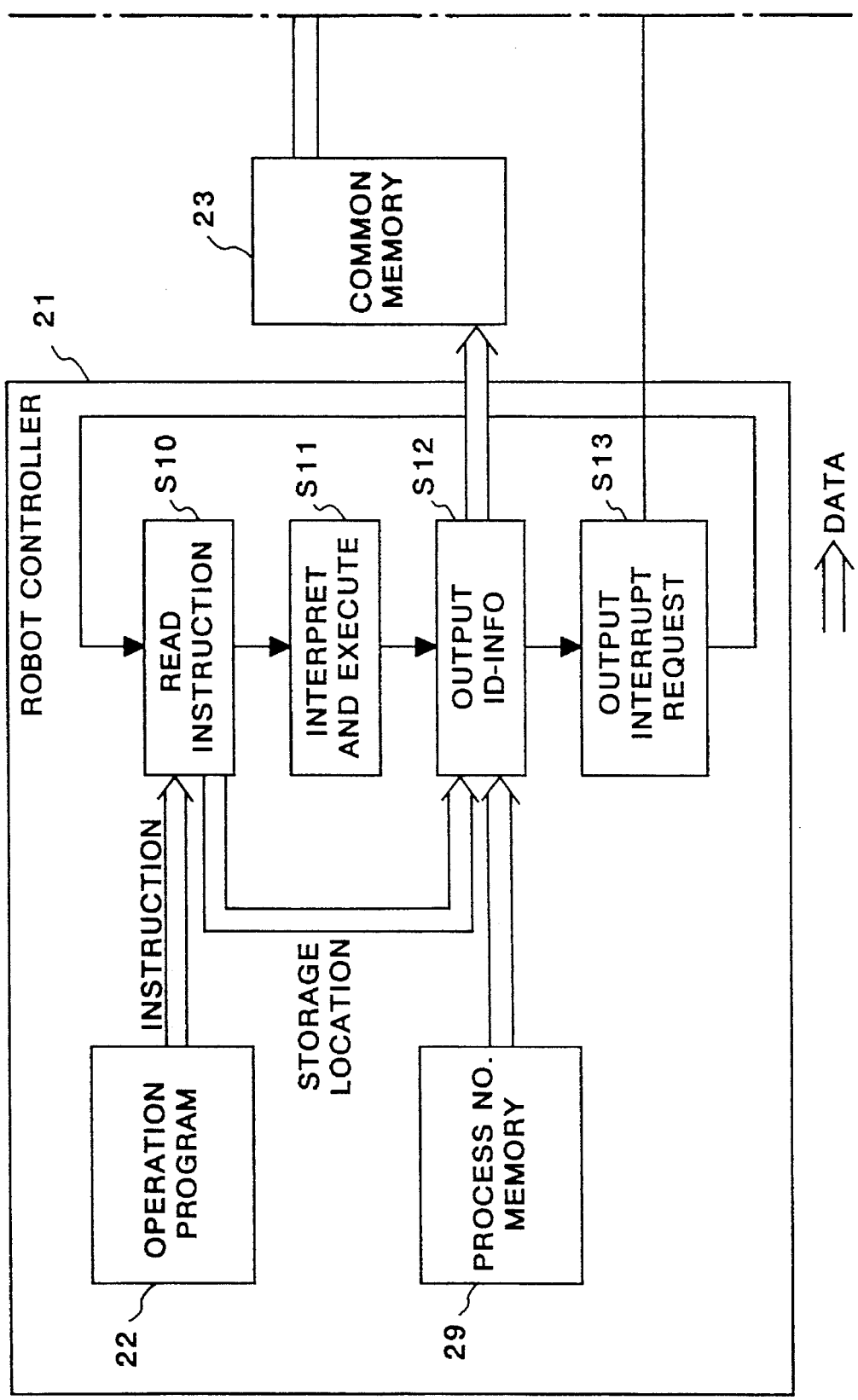
FIGS. 2A and 2B together constitute a block diagram illustrating the functional construction of a robot, which is one example of an industrial automated apparatus according to the present invention.

FIG. 1 is a diagram illustrating the concept of an arrangement for realizing a system which outputs the execution times of an industrial automated apparatus according to the present invention.

In an industrial robot, there are provided ID-information output means 3 which, whenever instruction interpreting and executing means 2 interprets and executes an instruction 8 of an operation program 1, outputs ID information 9 indicating where the instruction is written in the operation program 1; time appending means 4 for reading, from timekeeping means 4a, the time at which the ID information 9 was outputted by the ID-information output means 3, and appending this time to the ID information 9; registering means 5 for registering ID information indicative of instructions whose execution times are desired to be measured; comparing and selecting means 6 for comparing ID information 11, which is indicative of an instruction whose execution time is to be measured, already stored in the registering means 5, with time-series ID information 10 outputted by the time appending means 4, and selecting time-series ID information 12 found to be the same as the ID information 11 compared; and storing means 7 for storing, in a buffer or the like, the selected time-series ID information 12 of the instruction whose execution time is to be measured. These means make it possible to measure the execution time of any instruction in the operation program 1, as well as the execution time between instructions.

<Detailed Construction>

Figure 2B:
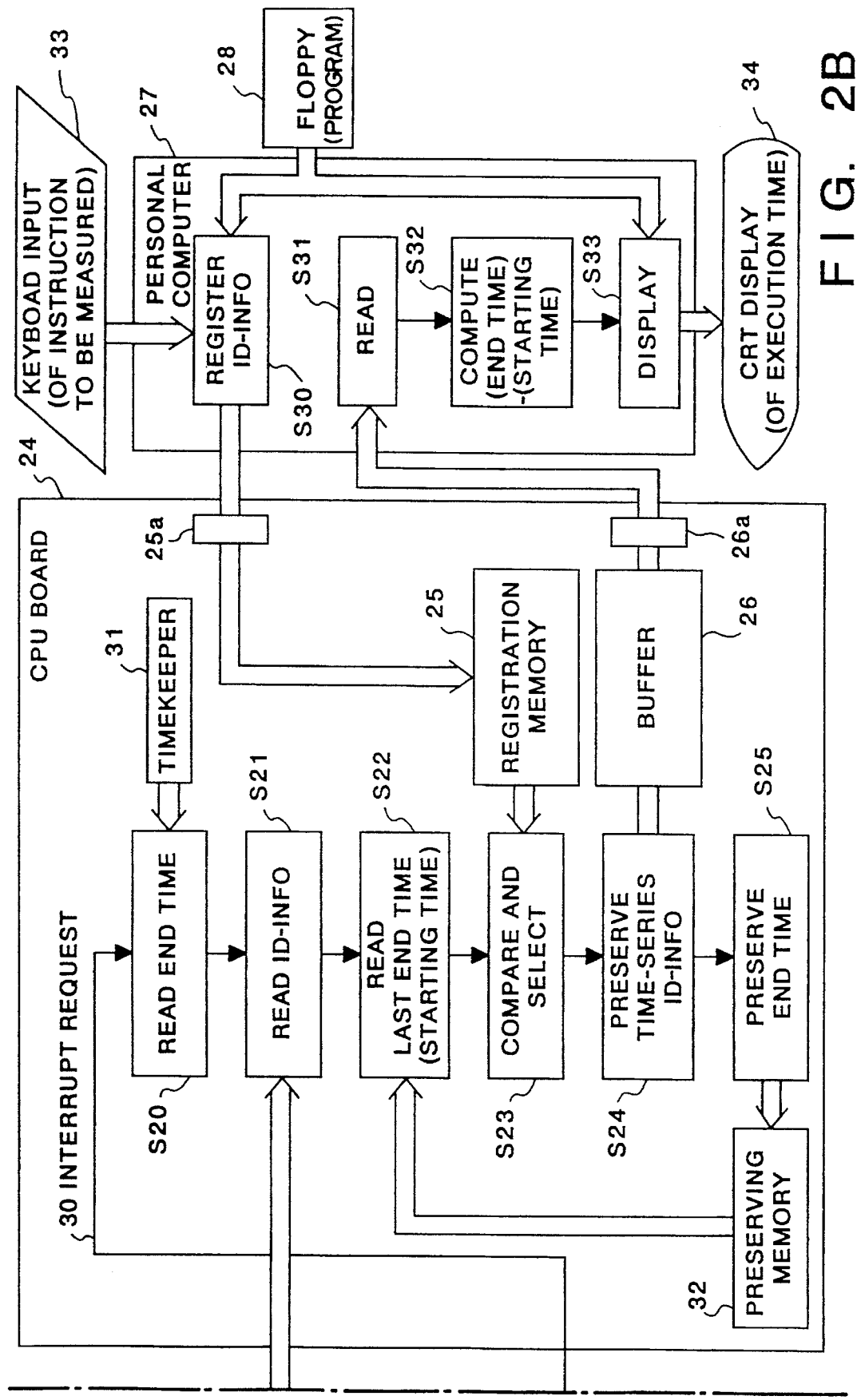

FIGS. 2A and 2B together constitute a diagram showing the functional construction of a robot, which is one example of an industrial automated apparatus according to the present invention. The large arrows ⇒ indicate the flow of data, and the small arrows (→) indicate the flow of control.

As shown in FIGS. 2A and 2B, a robot controller 21 has an operation program 22 consisting of a series of instructions. The storage location of each instruction is expressed by a program number and a line number, as illustrated in FIG. 3. The robot controller 21 includes a CPU which reads (S10) the instructions of the operation program; interprets and executes (S11) a read instruction; transfers (S12) the ID information to a common memory 23 immediately after the execution of the read instruction and before interpretation of the next instruction, the ID information comprising the program number and line number of the instruction just executed, as well as a process number, which controls branching of the operation program, from a process-number memory 29; and outputs (S13) an interrupt request 30. The ID information transferred to the common memory 23 comprises a Process No. 41, a Program No. 42, and a Line No. 43, as shown in FIG. 4 by way of example.

A CPU board 24 shares a bus with the robot controller 21. When the CPU of the board receives the interrupt request 30 from the robot controller 21, the CPU reads in, from a timekeeping unit 31, the moment at which the present instruction ends and stores this time in a preserving memory 32 (S20). Next, the CPU reads out the ID information stored in the common memory 23 (S21), and reads the time at which the immediately preceding interrupt request was received out of the preserving memory 32 (S22). If the aforementioned ID information agrees with ID information already stored in a registration memory 25 (S23), the board CPU appends the time to the ID information and stores the ID information and appended time in a buffer 26. The CPU preserves the instruction end time in the preserving memory 32 as the starting time of the next instruction and advances the pointer of the buffer 26. When the CPU board receives the code of measurement end via a serial port 25a, the CPU transmits the data in buffer 26 from a serial port 26a. The ID information and execution time stored in the buffer 26 are the result of adding instruction end-time 44 and immediately preceding end time 45 to the Process No. 41, Program No. 42 and Line No. 43 of FIG. 4 by way of example. It should be noted that the present embodiment can be attained even if the items of time information 44 and 45 alone are used.

A personal computer 27 is connected to the CPU board 24 so that serial communication can be performed. Using a keyboard 33, a user enters the ID information of an instruction, which is contained in the operation program 22, whose execution time is desired to be obtained. When this is done, the ID information is transmitted to the registration memory 25 of the CPU board 24 (S30). When the time-series ID information that has been stored in the buffer 26 is received (S31) by the CPU board 24, the difference between the two times (S32), namely the execution time from the end of execution of the last instruction to the end of execution of the presently prevailing instruction, is displayed on a CRT 34 (S33) along with this operation program instruction corresponding to the ID information.

In this embodiment, only execution time of the instruction selected by the registered ID information is stored in the buffer 26. However, an arrangement is possible in which all execution times are stored successively and a prescribed instruction is selected by ID information from these stored execution times.

<Example of Specific Application>

Figure 5:
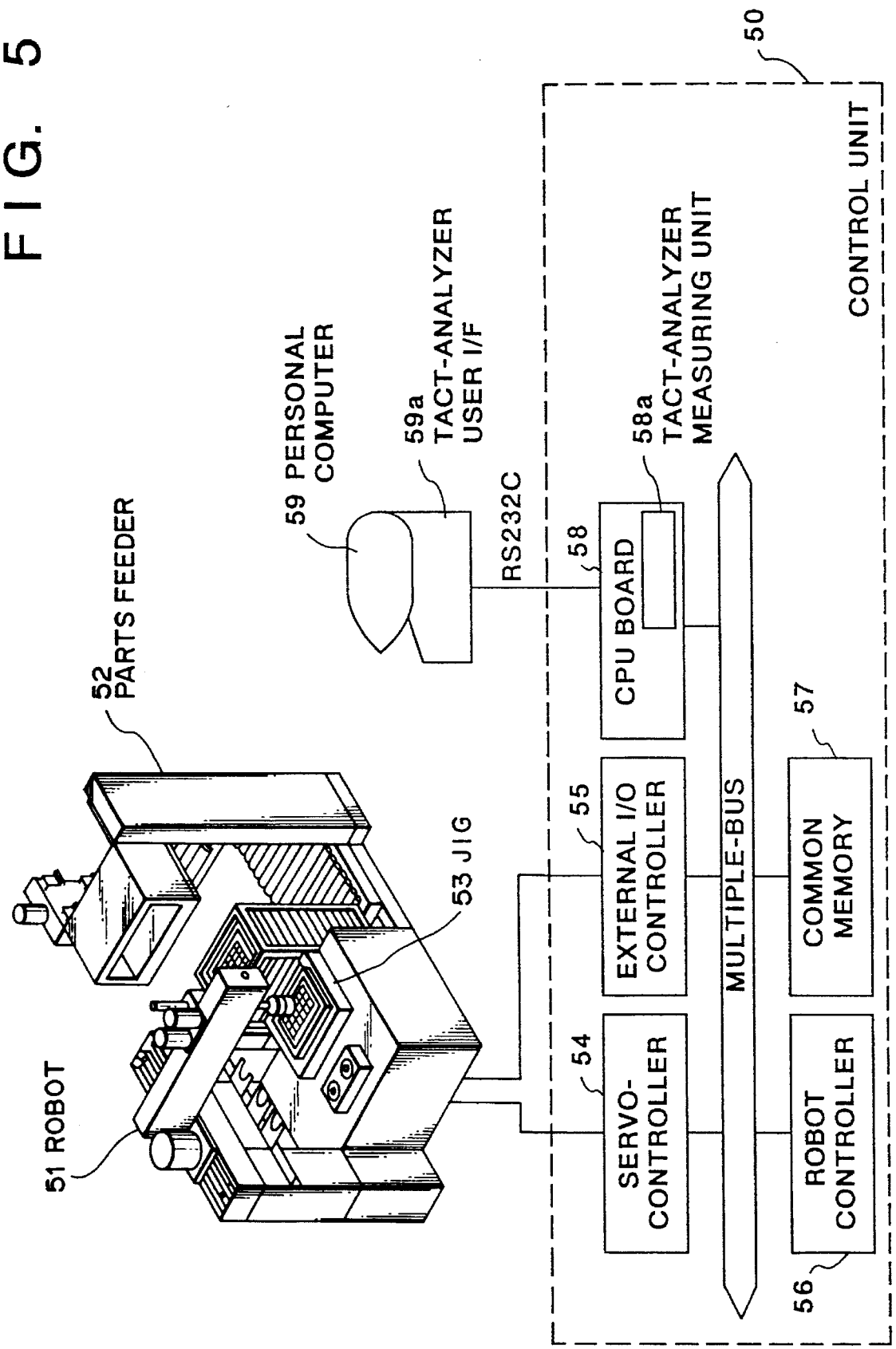
FIG. 5 is a diagram illustrating the manner in which a tact analyzer is connected to an assembly robot system.

FIG. 5 is a diagram illustrating the manner in which a tact analyzer is connected to an assembly robot system.

The assembly robot system comprises a robot 51, a jig 53, a parts feeder 52 and a control unit 50.

The control unit 50 of the assembly robot system employs a multiple bus. The robot controller 56 has a robot language processor for interpreting the operation program of the assembly robot system and outputting instructions to a servo-controller 54 and external I/O controller 55. The robot controller 56 further has multiple-task functions and simultaneously controls the robot 51 and the parts feeder 52. In this example, one task (task 0) is assigned to the robot 51, and three tasks (task 1, 2 and 3) are assigned to the parts feeder 52. The tasks correspond to the processes shown in FIG. 2.

The servo-controller 54 accepts target coordinates from the robot controller 56 and controls the servomotors for the various axes of the robot 51. In accordance with an I/O map of a common memory 57 connected to the multiple-bus, the external I/O controller 55 controls the jig 53 and parts feeder 52 of the assembly robot system.

A CPU board 58 has a tact-analyzer measuring unit 58a for recording the operating states of the robot system in the form of a time series. A personal computer 59 has a tact-analyzer user I/F unit 59a which connects the CPU board 58 with an RS232C. A copy of the operation program of robot controller 56 is recorded on a disk (not shown) of the personal computer 59.

(Constitution of Operation Program)

FIG. 6 illustrates examples of operation programs. Operation instructions are written in BASIC computer language, and each instruction has a line number. Subroutines (referred to as programs hereinafter) are constructed in units of individual activities, such as a part-assembly activity, and each is managed using a program number. The operation program of a task comprises a plurality of programs, and each task is managed using a task number.

(Creation of Trigger Table)

FIG. 7 illustrates the trigger input screen of the personal computer 59. Trigger information inputted from the personal computer 59 is transmitted from the tact-analyzer user I/F unit 59a to the CPU board 58 via the RS232C. This trigger information, which is stored in the form of a trigger table shown in FIG. 8, is utilized in judging instructions whose execution times are to be measured.

The trigger table is a list of measurement conditions such as ID information indicative of instructions whose execution times are to be measured. Each trigger comprises a line number, a program number, a task number, an option flag, a parallel operation instruction flag, and a parallel operation-complete check condition. The trigger table comprises a plurality of triggers, each of which is administered by a trigger number.

(Execution Sequence of Operation Program)

FIG. 9 is a flowchart illustrating the execution sequence of an operation program. This corresponds to the sequence S10–S13 of the robot controller 21 in FIG. 2.

First, a current task number, current program number and current line number shown in FIG. 10 are updated, then an operation instruction is read out at step S41, and the read instruction is interpreted and executed at step S42.

It should be noted that part of an operation instruction inhibits the next updating of the line number. For example, in case of a MOV instruction, target coordinates are designated from the servo-controller 54 to move the axes of the robot. However, this instruction inhibits the next updating of the line until the servo-controller 54 sets a flag for completion of axis motion in the common memory. In other words, even when a series of tasks is performed and the turn for the next processing cycle arrives, the same instruction is read in. From the second onward, however, only inspection of the flag which indicates completion of axis motion is carried out.

ID information comprising the current task number, current program number and current line number is written in the common memory at step S43. In case of an instruction, such as a MOV instruction, which does not update a line number, the same ID information is written in every time until the instruction completion conditions are established.

FIG. 11 shows a work table, which includes a common memory, for storing the ID information, instruction execution starting time and instruction execution end time. In this example, the common memory 23 and preservation memory 32 of FIG. 2 are unified and processing is simplified. Each item of information in FIG. 11 is used in ID read-in processing, described in detail below, of the tact analyzer measuring unit 58a.

Step S44 in FIG. 9 calls for an interrupt request to be sent to the tact-analyzer measuring unit 58a. Current task numbers are changed over successively (0→1→2→3→0→. . . ) at step S45. From step S45 the program returns to step S41.

FIG. 12 is a flowchart showing the processing sequence of the tact-analyzer measuring unit 58a.

First, at step S51, initialization of each flag used hereinafter and clearing of measured results are performed. The aforementioned trigger table is received from the tact-analyzer user I/F 59a at step S52. This is followed by step S53, at which a table (comprising line numbers, program numbers and task numbers) for comparing trigger ID information is created. This step serves as preparation for measurement. Next, the system waits for a measurement-start command to be sent from the tact-analyzer user I/F 59*a* at step S54.

When the measurement-start command is sent, the execution time of the instruction is measured at step S55 based upon the ID information issued by the robot controller 56. The processing for measuring this instruction execution time will be described in detail hereinbelow. When end of measurement is designated, the instruction execution time measured at step S55 is transmitted to the tact-analyzer user I/F 59*a* at step S56, after which the program returns to step S51.

(Sequence of Processing for Measuring Execution Time)

Figure 13:
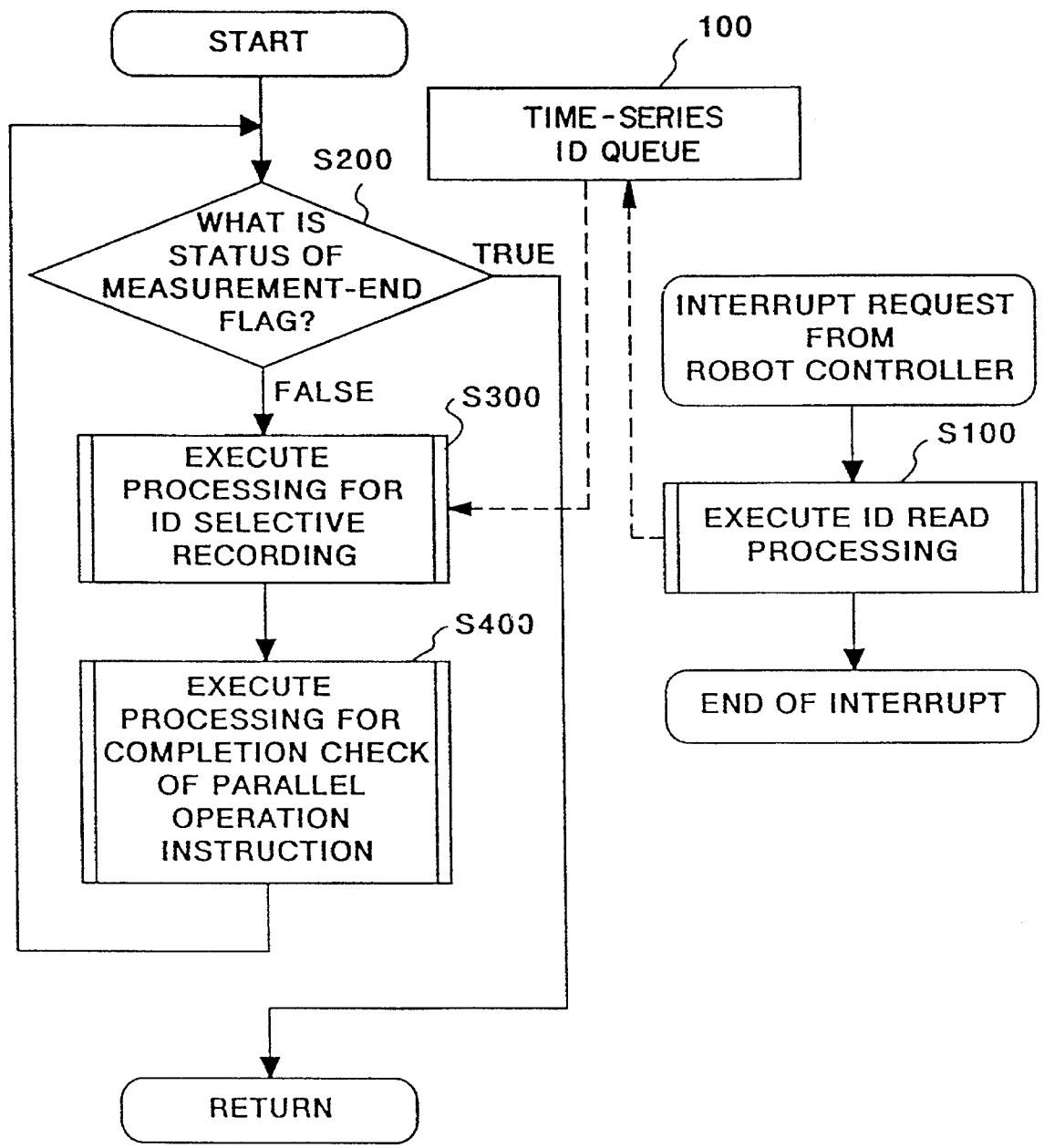
FIG. 13 is a flowchart showing the essentials of a processing sequence for measurement of execution time.

FIG. 13 is a flowchart illustrating the general features of a processing sequence for measuring execution time.

In response to the interrupt request from the robot controller 56, ID read-in processing of step S100 is started. This processing entails reading in ID information from the common memory, appending the time prevailing at this instant and writing the result in a time-series ID queue 100. In a case where the same ID is read in consecutively, only the time appended to the immediately preceding recorded ID is rewritten to the presently prevailing time, and the present ID is discarded without being added to the time-series ID queue 100.

In terms of foreground, the time-series ID is read out of the time-series ID queue 100 by ID selective recording processing of step S300, this ID is compared with the IDs of the trigger table (FIG. 8), and an ID for which agreement is found is recorded in a trace buffer (FIG. 17A). In a case where a recording-control flag in the trigger table is indicative of end of measurement, the measurement-end flag is made true, the program returns from step S200 and measurement of execution time is terminated.

Step S400 is processing for checking completion of a parallel operation instruction. In a case where an instruction-completion check flag in the trigger table of the read ID is true, the processing of step S400 entails checking to determine, in accordance with the instruction-completion check conditions, whether an instruction is being executed, and then recording completion time when the instruction is completed. The checking processing is executed every 5 ms.

(Sequence of Processing for ID Read-In)

Figure 14:
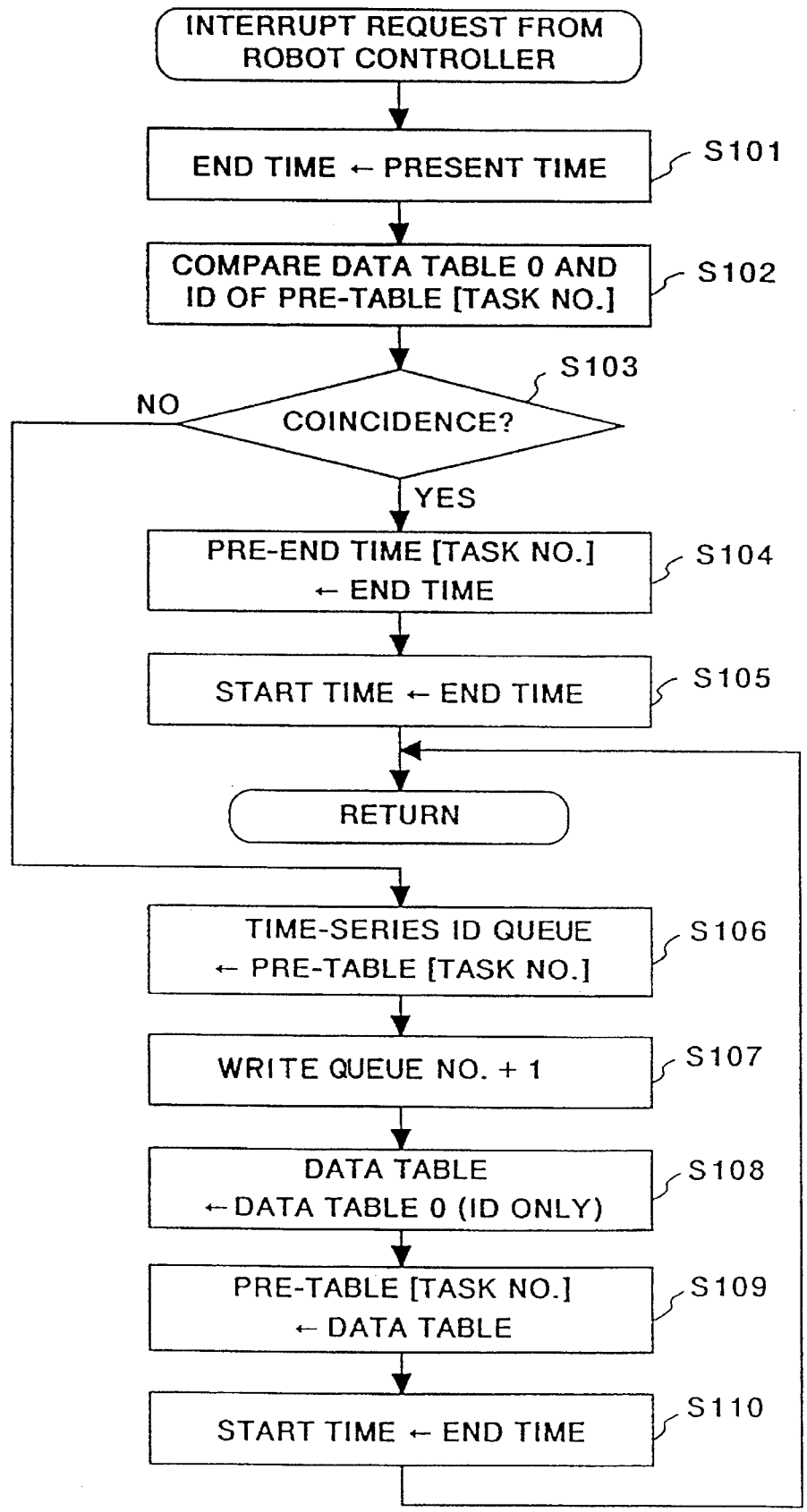
FIG. 14 is a flowchart showing the sequence of processing for reading in ID information.

FIG. 14 is a flowchart showing the sequence of processing for reading in the ID. In this sequence, processing is performed in such a manner that the work table of FIG. 11 is used to correlate the starting time and end time with each ID and place these in the time-series ID queue 100 shown in FIG. 15.

First, the present time is stored in an End-Time area at step S101. Next, at step S102, the robot controller 56 compares the ID information of Data Table 0 written in at step S43 with the ID information of a Pre-Table (Task No.), and branching is performed at step S103 based upon the result of the comparison.

If the items of compared ID information agree, the program proceeds to step S104, where the content of End Time is stored in Pre-End Time (Task No.), and thence to step S105, at which the content of End Time is stored in a Start-Time area, after which the program returns.

If the items of compared ID information do not agree, the program proceeds from step S103 to step S106, at which the content of Pre-Table (Task No.) is written in the time-series ID queue 100, and thence to step S107, at which the queue number for writing to the time-series ID queue 100 is incremented.

The ID information of Data Table 0 is shifted to the position of the ID of Data Table at step S108, the content of Data Table is shifted to Pre-Table (Task No.) at step S109, and the content of End-Time is shifted to Start Time at step S110, after which the program returns.

(Sequence of Processing for ID Selective Recording)

Figure 16A:
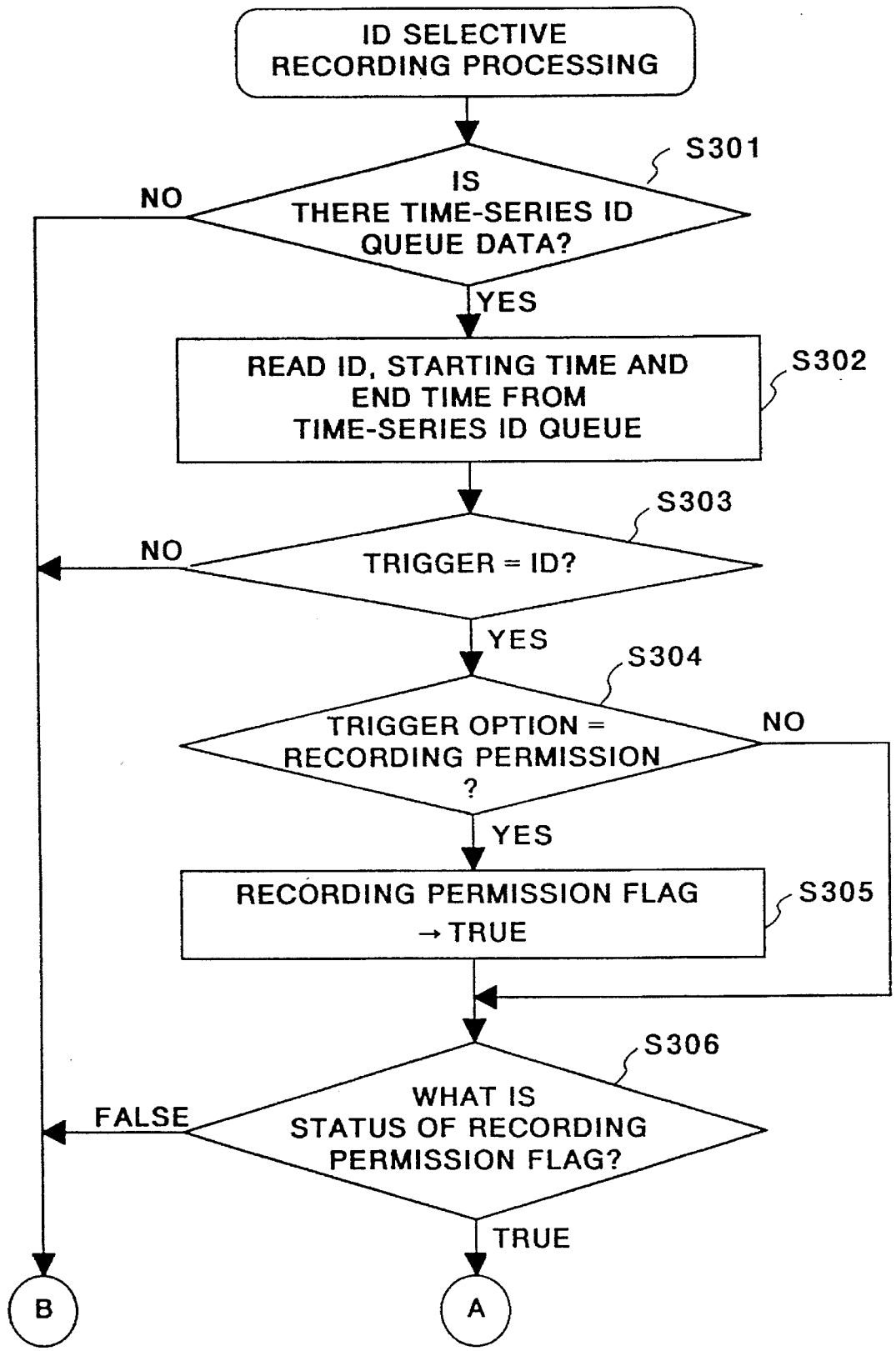
FIGS. 16A and 16B together constitute a flowchart illustrating the sequence of ID selection and recording processing.
Figure 16B:
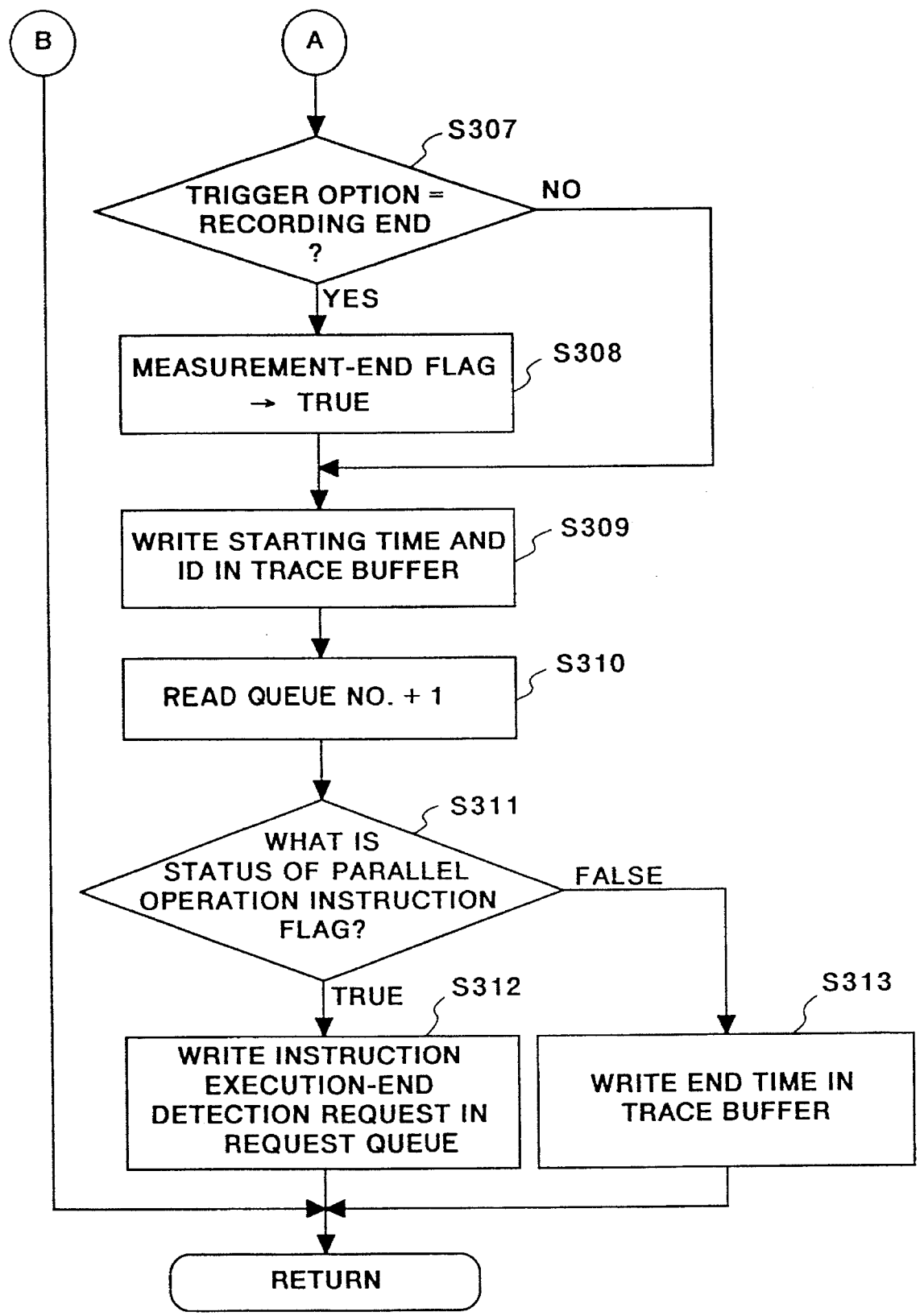

FIGS. 16A and 16B together constitute a flowchart illustrating the sequence of processing for ID selective recording. In this sequence, information having an ID which agrees with an ID of the trigger table is selected from the information stored in the time-series ID queue 100, the selected information is stored in the trace buffer shown in FIG. 17A, a queue requesting a check of completion of the parallel operation instruction shown in FIG. 17B is created from the instruction-complete check flag of the trigger table, and a recording-permission flag or a measurement-end flag is set from the recording control flag.

First, at step S301, it is determined whether data that has not yet undergone selection processing is in the time-series ID queue 100. This entails checking whether a write queue number and a read queue number coincide. If there is data in the queue 100, the program proceeds to step S302, where contents indicated by the read queue number are read out of the time-series ID queue 100, and thence to step S303, at which it is determined whether an ID which coincides with this is in the trigger table.

If there is an ID that coincides, the program proceeds to step S304. A check is performed at step S304–S306 to see whether recording is allowed, and a check is performed at steps S307, S308 to see whether recording has ended.

The ID and the starting time are written in the trace buffer at step S309, and the read queue number of the time-series ID queue 100 is incremented at step S310. The parallel operation instruction flag of the corresponding ID in the trigger table is checked at step S311. If the flag has been set, the program proceeds to step S312. Here, in order to request detection of the end of instruction execution, the request is written in the completion-check request queue of FIG. 17B at step S312, after which the program returns. If the flag has not been set, the end time is written in the trace buffer at step S313, after which the program returns.

(Sequence for Checking Completion of Parallel Operation Instruction)

FIG. 18 is a flowchart illustrating the sequence for checking completion of a parallel operation instruction.

First, at step S401, it is determined whether 5 ms has elapsed since the immediately preceding check. If this period of time has elapsed, the program proceeds to step S402, at which the completion-check request queue for the parallel operation instruction of FIG. 17B is read out, and thence to step S403, at which a check is executed in accordance with the request. It is determined at step S404 whether the check conditions have been established. If they have, the program proceeds to step S405, at which the present time is written in the end time of the trace buffer indicated by the request pointer.

(Output of Instruction Execution Time)

FIG. 19 is a diagram illustrating examples of outputs of instruction execution times that appear on the display screen of the personal computer 59. The contents of the trace buffer are outputted and displayed at the trace buffer number, trigger number and execution starting time; the difference obtained by subtracting the starting time from the end time of the trace buffer is displayed at execution time; the contents of trigger table referred to from the trigger number of the trace buffer are displayed at the task number, program number and line number; and contents based upon the task number, program number and line number are displayed at the operation program and instruction.

<Description of Specific Example of Operation>

A specific example of operation will now be described in detail for a case where the trigger table of FIG. 8 has been set with respect to the operation program of FIG. 6.

(1) Initial Conditions

An operation program of the kind shown in FIG. 6 is located in the robot controller 56.

A trigger table entered from the personal computer 59 by the user is transmitted to the tact-analyzer measuring unit 58a via the tact-analyzer user I/F 59a and RS232C. Execution-time measurement processing is executed in response to a measurement-start command.

The robot controller 56 executes the program from Task No. 0, Program No. 0 and Line No. 10. It will be assumed that the present time is an instant at which execution of an instruction (N=N+1) of Task No. 0, Program No. 1 and Line No. 20 has ended.

(2) ID Write-in

① First write-in

The robot controller 56 writes the ID information, namely Task No. 0, Program No. 1 and Line No. 20 in the joint memory, issues an interrupt request to the duct-analyzer measuring unit 58a, and changes over the current task number from 0 to 1.

② Second write-in

The current program number of Task No. 1 is 0, and the line number is 30. This instruction is WAIT-INP (124)=1, and the next line is not executed until port 124 becomes 1. If the order prior to this was Task No. 1, the same instruction will have been executed. However, since the port 124 was 0, the current instruction point is not updated.

The robot controller 56 writes the ID information, namely Task No. 1, Program No. 0 and Line No. 30 in the joint memory, issues an interrupt request to the duct-analyzer measuring unit 58a, and changes over the current task number from 1 to 2.

③ Third write-in

The current program number of Task No. 2 is updated to 0, and the line number is updated from 30 to 40.

Following instruction execution, the robot controller 56 writes the ID information, namely Task No. 2, Program No. 0 and Line No. 40 in the joint memory, issues an interrupt request to the duct-analyzer measuring unit 58a, and changes over the current task number from 1 to 2.

④ Fourth write-in

The current program number of Task No. 3 is updated to 0, and the line number is updated from 50 to 60.

Following instruction execution, the robot controller 56 writes the ID information, namely Task No. 3, Program No. 0 and Line No. 60 in the joint memory, issues an interrupt request to the duct-analyzer measuring unit 58a, and changes over the current task number from 3 to 1.

Thereafter, and in similar fashion, the ID information is written in, and an interrupt request is issued, whenever execution of one instruction ends.

(3) ID Read-In

① First interrupt request

ID read-in processing starts in response to an interrupt request.

First, the present time is read out and then written in "Current End Time (End-Time)". The last ID and current ID of Task No. 0 are compared. The last ID of Task No. 0 is Program No. 1, Line No. 10, which does not coincide with the current ID, namely Program No. 1, Line No. 20. Therefore, processing branches in a direction to record the ID. The "last ID, end time and starting time of Task No. 0" are written in the time-series ID queue. This is Time-Series ID (A), Task No. 0, Program No. 1, Line No. 10 of FIG. 15. Thereafter, "current ID", "current end time" and "current starting time" of Data-Table are copied to the preceding table [Pre-Table (0)] of Task No. 0.

Furthermore, "current end time (End-Time)=present time" is written in "present starting time (Start-Time). The reason for this is that the present time also is the starting time of the next instruction.

② Second interrupt request

ID read-in processing starts in response to an interrupt request.

First, the present time is read out and then written in "Current End Time". The last ID and current ID of Task No. 1 are compared. The last ID of Task No. 1 is Program No. 0, Line No. 30, which does coincides with the current ID. Therefore, processing branches in a direction to discard the ID.

The "last end time" of Task No. 1 is made "current end time (End-Time)=present time" "Current end time= present time" is written in "present starting time". The reason for this is that the present time also is the starting time of the next instruction.

③ Third interrupt request

ID read-in processing starts in response to an interrupt request.

First, the present time is read out and then written in "Current End Time". The last ID and current ID of Task No. 2 are compared. The last ID of Task No. 2 is Program No. 0, Line No. 30, which does not coincide with the current ID, namely Program No. 0, Line No. 40. Therefore, processing branches in a direction to record the ID.

The "last ID, end time and starting time of Task No. 2" are written in the time-series ID queue. This is Time-Series ID (B), Task No. 2, Program No. 0, Line No. 30 of FIG. 15. Thereafter, "current ID", "current end time" and "current starting time" (set at ②) are copied to the preceding table [Pre-Table (2)] of Task No. 0. The period of time from starting time to end time is the execution time of the instruction (PRINT-A) corresponding to the ID.

Furthermore, "current end time=present time" is written in "present starting time. The reason for this is that the present time also is the starting time of the next instruction.

④ Fourth interrupt request

ID read-in processing starts in response to an interrupt request.

First, the present time is read out and then written in "Current End Time". The last ID and current ID of Task No. 3 are compared. The last ID of Task No. 3 is Program No. 0, Line No. 50, which does not coincide with the current ID, namely Program No. 0, Line No. 60. Therefore, processing branches in a direction to record the ID.

The "last ID, end time and starting time of Task No. 3" are written in the time-series ID queue. This is Time-Series ID (C), Task No. 3, Program No. 0, Line No. 50 of FIG. 15. Thereafter, "current ID", "current end time" and "current starting time" (set at ③) are copied to the preceding table [Pre-Table (3)] of Task No. 0. The period of time from starting time to end time is the execution time of the instruction [SET-MOV-P(2)] corresponding to the ID.

Furthermore, "current end time=present time" is written in "present starting time. The reason for this is that the present time also is the starting time of the next instruction.

(4) ID Selective Recording

A time-series ID is read out of the time-series ID queue and compared with the IDs of the trigger table. A time-series ID which coincides is added to the trace buffer.

① First time-series ID

Task No. 0, Program No. 1 and Line No. 10 of the time-series ID [time-series ID (A)] read first are not in the trigger table, and therefore the ID is not recorded.

② Second time-series ID

Task No. 1, Program No. 0 and Line No. 30 of the time-series ID [time-series ID (B)] read second are in the trigger table (Trigger No. 0), and therefore the ID is recorded.

③ Third time-series ID

Task No. 3, Program No. 0 and Line No. 50 of the time-series ID [time-series ID (C)] read third are in the trigger table (Trigger No. 1), and therefore the ID is recorded. Since the instruction-end check flag in the trigger table is true, the pointer at which Trigger No. 1 and the time-series ID are recorded is registered in the completion-check request queue of the parallel operation instruction.

(SET-MOV) outputs the target position to the servo-controller. However, the next command is executed without waiting for the end of positioning. In order to measure the time required for positioning, a request for checking completion of the parallel operation instruction must be registered in the trigger table.

(5) Check of Completion of Parallel Operation Instruction

A trigger number is read out of the completion-check request queue of the parallel operation instruction every 5 ms, and the status of the robot system is examined in accordance with the instruction-completion check conditions of this trigger. Accordingly, Trigger No. 1 is read, and it is determined whether a positioning-completion flag is true or not. If the flag is true, the present time is written in the end time of the time-series ID indicated by the pointer.

(6) End of Measurement

In a case where the recording control flag is indicative of the end in the trigger table, measurement of execution time is terminated and the time-series ID recorded in the buffer is transmitted to the tact-analyzer user I/F 59a.

(7) Instruction Execution-time Output Display

The difference between the starting time and end time of the time-series ID, namely the execution time of the instruction corresponding to the ID, is displayed.

By virtue of the foregoing arrangement of the 25 present invention, there can be provided a system for outputting the execution times of an industrial automated apparatus, in which the execution times of desired instructions are outputted accurately in individual instruction units.

Further, there can be provided a system for outputting the execution times of an industrial automated apparatus, in which the execution times of desired instructions, in processing for executing a plurality of tasks in parallel, are outputted accurately.

Further, there is provided a system for outputting the execution times of an industrial automated apparatus, in which the execution times of parallel operating instructions are outputted accurately.

More specifically, the execution time of any instruction in an operation program, as well as the execution time between instructions, can be measured without altering the operation program. Accordingly, the following advantages are obtained:

(1) The efficiency of the measurement operation is improved.

(2) It is possible to measure the execution time of an instruction, such as an arithmetic instruction, whose motion cannot be observed from the outside.

(3) Since the operation program is not altered, there is no risk of bugs being produced.

As many apparently widely different embodiments of the present invention can be made without departing from the spirit and scope thereof, it is to be understood that the invention is not limited to the specific embodiments thereof except as defined in the appended claims.

What is claimed is:

1. A method for calculating robotic-operation execution time of an industrial automated apparatus, the apparatus including a first controller and a second controller, said method comprising the steps of:

receiving in the second controller ID information identifying a desired robotic operation in which its robotic-operation execution time is to be calculated;

operating the first controller, at an execution of each of a plurality of instructions composing a robotic operation, to store ID information identifying the instruction into a first memory and transfer an interrupting signal indicative of the termination of the instruction to the second controller;

detecting, with the second controller, a reception time of receiving the interrupting signal from the first controller and reading ID information out of the first memory in response to the interrupting signal; and comparing, with the second controller, the ID information read out of the first memory with the received ID information, and when the ID information read out of the first memory corresponds to the received ID information, calculating a difference between the reception time presently detected and a reception time previously detected as robotic-operation execution time.

2. The method according to claim 1, further comprising the step of storing, by operation of the second controller, the detected reception time into a second memory.

3. The method according to claim 1, wherein the ID information includes at least a program number and a line number of the program to which an executed instruction belongs.

4. The method according to claim 1, further comprising the step of operating the first controller to transfer the interruption signal to the second controller after execution of each instruction and before execution of a next instruction.

5. A method for calculating robotic-operation execution time of an industrial automated apparatus comprising the steps of:

inputting ID information identifying a desired robotic-operation in which its robotic-operation execution time is to be calculated;

executing a program having a plurality of instructions for a robotic-operation;

storing ID information identifying each of the instructions into a first memory at execution of the instruction;

detecting a termination time of an executed instruction; and determining whether or not ID information stored in the first memory corresponds to the ID information inputted at said input step, and when the ID information read out of the first memory corresponds to the ID information inputted at said input step, calculating a difference between the termination time detected at said detection step and a termination time of previously-executed instruction as robotic-operation execution time.

6. The method according to claim 5, wherein the ID information includes at least a program number and a line number of the program to which an executed instruction belongs.

7. The method according to claim 5, further comprising the step of storing the termination time detected at said detection step into a second memory.

8. A system for calculating robotic-operation execution time of an industrial automated apparatus, comprising:

input means for inputting ID information of a desired robotic-operation in which its robotic-operation execution time is to be calculated;

program execution means for executing a program having a plurality of instructions for a robotic-operation, wherein said program execution means generates ID information identifying the instruction at execution of each of the instructions and generates an interrupting signal upon termination of the instruction;

a first memory for storing the ID information generated by said program execution means; and calculating means for detecting reception time of receiving the interrupting signal, determining whether or not the ID information stored in said memory corresponds to the ID information inputted by said input means, and when the ID information read out of said first memory corresponds to the ID information inputted by said input means, calculating a difference between the detected reception time and a reception time of a previous interrupting signal as robotic-operation execution time.

9. The system according to claim 8, wherein the ID information includes at least a program number and a line number of the program to which an executed instruction belongs.

10. The system according to claim 8, wherein said calculation means has a second memory for storing the reception time of the detected interruption signal.

11. The system according to claim 8, wherein said program execution means generates the interruption signal after execution of each instruction and before execution of a next instruction.

12. A system for calculating robotic-operation execution time of an industrial automated apparatus comprising:

input means for inputting ID information of a desired robotic operation in which its robotic-operation execution time is to be calculated;

program execution means for executing a program having a plurality of instructions for a robotic operation;

a first memory for, at execution of each of the instructions by said program execution means, storing ID information identifying the instruction;

detection means for detecting termination time of the instruction executed by said program execution means;

determination means for determining whether or not the ID information stored in said memory corresponds to the ID information inputted by said input means; and calculation means for, when said determination means determines that the ID information read out of said first memory corresponds to the ID information inputted by said input means, calculating a difference between the termination time detected by said detection means and a termination time of previously-executed instruction as robotic-operation execution time.

13. The system according to claim 12, wherein the ID information includes at least a program number and a line number of the program to which an executed instruction belongs.

14. The system according to claim 12, further comprising a second memory for storing the termination time detected by said detection means.

* * * * *

UNITED STATES PATENT AND TRADEMARK OFFICE
CERTIFICATE OF CORRECTION

PATENT NO. : 5,517,639
DATED : May 14, 1996
INVENTOR(S) : Yamaguchi

It is certified that error appears in the above-indentified patent and that said Letters Patent is hereby corrected as shown below:

Title page,
[56] REFERENCES CITED:

U.S. PATENT DOCUMENTS, "5,173,809 12/1992 Sakamoto et al." should read --5,173,869 12/1992 Sakamoto et al.--.

COLUMN 1:

Line 18, "produced." should read --product.--.

Signed and Sealed this

Fourteenth Day of January, 1997

Attest:

BRUCE LEHMAN

*Attesting Officer*   *Commissioner of Patents and Trademarks*